(12) United States Patent  
Mast

(10) Patent No.: US 6,284,138 B1
(45) Date of Patent: Sep. 4, 2001

(54) METHOD AND ARRANGEMENT FOR INTRODUCTION OF SEWAGE PRE-TREATMENT UPSTREAM OF SEWAGE TREATMENT FACILITY

(75) Inventor: Dennis L. Mast, Sanford, NC (US)

(73) Assignee: Hydro Flo, Inc., Sanford, NC (US)

( * ) Notice: Subject to any disclaimer, the term of this patent is extended or adjusted under 35 U.S.C. 154(b) by 0 days.

(21) Appl. No.: 09/481,751

(22) Filed: Jan. 11, 2000

(51) Int. Cl.$^7$ .................................................... C02F 3/02
(52) U.S. Cl. .................... 210/606; 210/610; 210/620; 210/632; 210/747; 210/760; 210/170; 210/209; 210/920
(58) Field of Search .................... 210/610, 620, 210/631, 632, 710, 747, 170, 209, 220, 920, 606

(56) References Cited

U.S. PATENT DOCUMENTS

| | | | |
|---|---|---|---|
| 1,439,406 | | 12/1922 | Elrod . |
| 1,963,354 | * | 6/1934 | Currie .................................. 210/209 |
| 2,788,127 | | 4/1957 | Davidson ............................... 210/95 |
| 3,335,082 | * | 8/1967 | Ullrich ................................. 210/620 |
| 3,525,685 | * | 8/1970 | Edwards ............................... 210/620 |
| 3,607,735 | * | 9/1971 | Hover .................................. 210/170 |
| 3,734,850 | * | 5/1973 | Karr ..................................... 210/220 |
| 3,826,742 | * | 7/1974 | Kirk et al. ............................ 210/220 |
| 3,875,051 | | 4/1975 | Kovarik ................................. 210/2 |
| 3,957,633 | * | 5/1976 | Gatti et al. ............................ 210/220 |
| 3,959,142 | * | 5/1976 | Dupre .................................. 210/170 |
| 4,115,258 | * | 9/1978 | Smith et al. .......................... 210/170 |
| 4,148,726 | * | 4/1979 | Smith ................................... 210/170 |
| 4,797,208 | * | 1/1989 | Miller et al. .......................... 210/632 |
| 4,911,843 | * | 3/1990 | Hunniford et al. ................... 210/610 |
| 4,919,814 | | 4/1990 | Carnahan et al. .................... 210/603 |
| 4,940,539 | * | 7/1990 | Weber .................................. 210/632 |
| 5,013,441 | | 5/1991 | Goronszy ............................. 210/605 |
| 5,332,502 | | 7/1994 | Wickens et al. ...................... 210/605 |
| 5,578,211 | * | 11/1996 | Dickerson ............................ 210/610 |
| 5,798,044 | | 8/1998 | Strohmeier et al. ................. 210/605 |
| 5,807,484 | | 9/1998 | Couture et al. ....................... 210/605 |
| 5,861,095 | | 1/1999 | Vogel et al. .......................... 210/605 |

\* cited by examiner

*Primary Examiner*—Christopher Upton
(74) *Attorney, Agent, or Firm*—Michael R. Swartz; John R. Flanagan

(57) ABSTRACT

A method and arrangement for sewage pre-treatment in a sewer pipeline infrastructure upstream of a sewage treatment facility of a sewage treatment system includes selecting a site in the sewer pipeline infrastructure between a source of untreated sewage and the sewage treatment facility of the system, providing a source of a biological activity enhancing agent at the preselected site, and introducing the agent from the source thereof into a flow of untreated sewage at the selected site so as to convert the sewage from an untreated state to a pre-treated state in the pipeline infrastructure upstream of the sewage treatment facility.

13 Claims, 3 Drawing Sheets

METHOD AND ARRANGEMENT FOR INTRODUCTION OF SEWAGE PRE-TREATMENT UPSTREAM OF SEWAGE TREATMENT FACILITY

BACKGROUND OF THE INVENTION

1. Field of the Invention

The present invention generally relates to treatment of sewage and, more particularly, is concerned with a method and arrangement for introduction of sewage pre-treatment at a site in a municipal sewage treatment system located upstream of a municipal sewage treatment facility of the system.

2. Description of the Prior Art

Municipal sewage (which, as used hereinafter, includes wastewater) collection, conveyance and treatment systems (hereinafter referred to as "sewage treatment systems") are extensive networks of interconnected pipeline infrastructure. Because of expansiveness and topography of municipal sewage treatment systems, sewage flows cannot always be conveyed by gravity. As a result, pumping sites are needed as part of the pipeline infrastructure to lift sewage flows over high points in the system or to the municipal treatment facilities.

A pumping site may be provided at a collection point of a project such as a housing development, an apartment complex development or a commercial office facility development The pumping site is used to pump untreated sewage collected from the development through a "force main" to a higher point where the untreated sewage can then flow by gravity to the municipal sewage treatment facility to be treated. The pumping site may also be provided at a point in the pipeline infrastructure where gravity flow is no longer able to deliver the untreated sewage to the sewage treatment facility due to the topography. The pumping site typically employs a collection sump receives and accumulates the untreated sewage from the upstream network of piping and a mechanical pump which then pumps the sewage from the collection sump through the force main to a higher point where the untreated sewage can flow by gravity to the sewage treatment facility to be treated. In a typical municipality, the sewage pipeline infrastructure of the sewage treatment system will contain numerous pumping sites to enable the flow of untreated sewage to reach the sewage treatment facility.

Odor control is understood to be the main problem in the sewer pipeline infrastructure of municipal sewage systems. Most odor producing compounds found in sewage result from anaerobic (without air) biological activity which consumes organic material, sulfur, and nitrogen found in the sewage. Organic odors are typically the result of biological activity that decomposes organic matter and forms a variety of malodorous gases.

At municipal sewage treatment facilities, sewage is typically treated using the processes of clarification, aeration and disinfection. The main additives in the treatment process are oxygen or air for biodegradation of the organics in the sewage and electrical power to operate pumps and compressors that deliver and mix the oxygen or air.

Due to expanding residential and commercial development the demands on municipal sewage treatment systems are ever increasing, requiring additional capital investment to meet the demands. However, the resources of municipalities are typically fee and tax based and consumed substantially by expenditures to cover current operating costs and oftentimes are insufficient to finance additional capital investments. Representative examples of various proposals to address this and other needs are those disclosed in U.S. Pat. No. 3,875,051 to Kovarik, U.S. Pat. No. 4,919,814 to Camahan et al., U.S. Pat. No. 5,332,502 to Wickens et al. and U.S. Pat. No. 5,807,484 to Couture et al.

However, none of these proposals appear to offer workable approaches for improvement of municipal sewage treatment systems without significant additional capital investment.

Consequently, a need still exists for innovation in connection with municipal sewage treatment systems which will increase the capacity of such systems with minimal additional capital investment.

SUMMARY OF THE INVENTION

The present invention provides a method and arrangement for introduction of sewage pre-treatment at a site upstream of a municipal sewage treatment facility which are designed to satisfy the aforementioned need. The innovation fostered by the sewage pre-treatment introduction method and arrangement of the present invention is the introduction of a biological activity enhancing agent into the flow of untreated sewage at a preselected site in the pipeline infrastructure of the municipal sewage treatment system located upstream of the sewage treatment facility so that the flow of sewage will be at least partially pre-treated by the time it reaches the sewage treatment facility. The method and arrangement of the present invention, more particularly, utilizes an existing pumping site to provide a convenient location to add the agent to the untreated sewage flow. The agent can be oxygen to convert an anaerobic state to an aerobic state in the sewage flow or ozone to deplete the bacteria content of the sewage flow. The addition of oxygen eliminates hydrogen sulfide (odor) and reduces organic loading of the sewage treatment facility. The biological activity fostered by the oxygen is further enhanced due to temperatures in the sewer pipeline infrastructure ordinarily being greater than at the sewage treatment facility. Higher biological efficiencies are thereby attained. As a result of the method and arrangement of the present invention, capacity of the sewage treatment facility can be significantly increased without a major capital investment.

Accordingly, the present invention is directed to a sewage pre-treatment introduction method which comprises the steps of: (a) selecting a site in a pipeline infrastructure of a sewage treatment system between a source of untreated sewage and a sewage treatment facility of the system; (b) providing a source of a biological activity enhancing agent at the selected site; and (c) introducing the agent from the source thereof into a flow of untreated sewage at the selected site so as to convert the sewage from an untreated state to a pre-treated state in the pipeline infrastructure upstream of the sewage treatment facility.

The present invention also is directed to a sewage pre-treatment introduction arrangement which comprises: (a) a selected site in a sewer pipeline infrastructure of a sewage treatment system between source of untreated sewage and a sewage treatment facility of the sewage treatment system; (b) a source of a biological activity enhancing agent at the selected site; and (c) introducing the agent from the source thereof into a flow of untreated sewage at the selected site so as to convert the sewage from an untreated state to a pre-treated state in the pipeline infrastructure upstream of the sewage treatment facility.

In both the pre-treatment introduction method and arrangement, the agent introduced can be an oxygen-bearing gas for changing the sewage flow from an anaerobic to aerobic state, an ozone-bearing gas for depleting the bacterial content of the sewage flow, or an enzyme for increasing the microbial activity in the sewage flow. The selected site can be a sewage collection site or a pumping site in the pipeline infrastructure. The agent can be introduced by use of an agent generator and a mixing device interposed in the piping of the infrastructure at the selected site which receives the introduced agent from the generator and mixes the agent with the sewage flow at the site. In the case where the selected site is a pumping site, the agent is mixed with the sewage flow either upstream or downstream of a pump at the pumping site.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
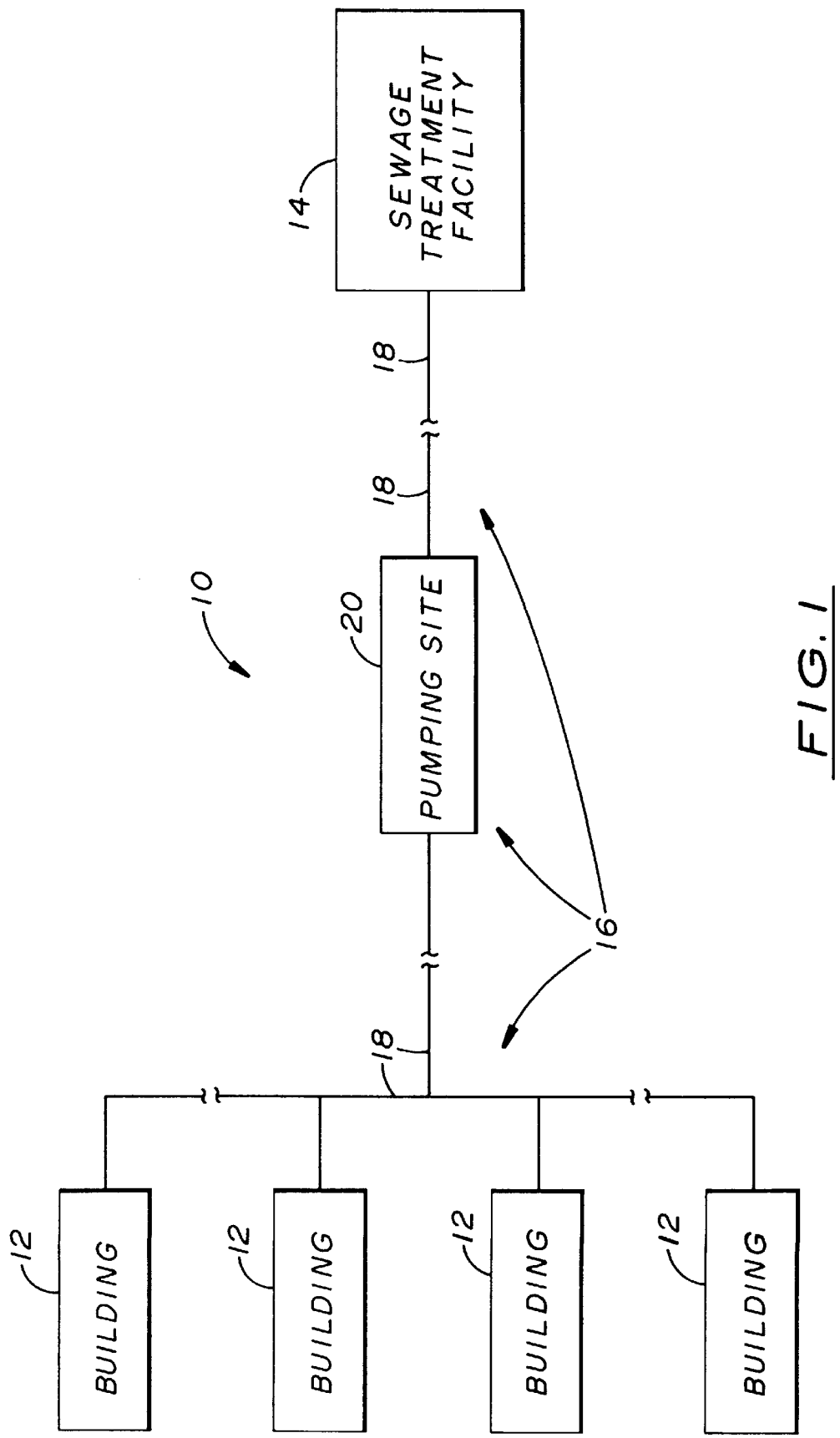
FIG. 1 is a simplified schematic representation of a portion of a prior art municipal sewage treatment system.

In the following detailed description, like reference characters designate like or corresponding parts throughout the several views of the drawings.

Referring to the drawings and particularly to FIG. 1, there is schematically illustrated in a simplified form a portion of an existing or a new municipal sewage treatment system, generally designated 10. In the sewage treatment system 10, there are multiple sources of untreated sewage, such as residential or commercial buildings 12, that are interconnected to a municipal sewage treatment facility 14 by a sewer pipeline infrastructure 16. The sewer pipeline infrastructure 16, which may be either under or above ground, basically includes a network of piping 18 and one or more pumping sites 20 which receive, accumulate or collect and transfer flow of sewage in untreated condition from the buildings 12 to the sewage treatment facility 14. As further seen in FIGS. 2 and 3, the pumping site 20 includes a housing 22, a collection sump 24 provided in one compartment of the housing 22, a main pressure pump 26 provided in another compartment of the housing 22 adjacent to the sump 24, inflow and outflow piping sections 28, 30 at opposite ends of the housing 22 for respectively routing a flow of sewage S from the external network of piping 18 into the collection sump 24 and routing a flow of sewage from the main pump 26 back to the network of piping 18, and a pressure regulator 31 interposed in the outflow piping section 30.

Figure 2:
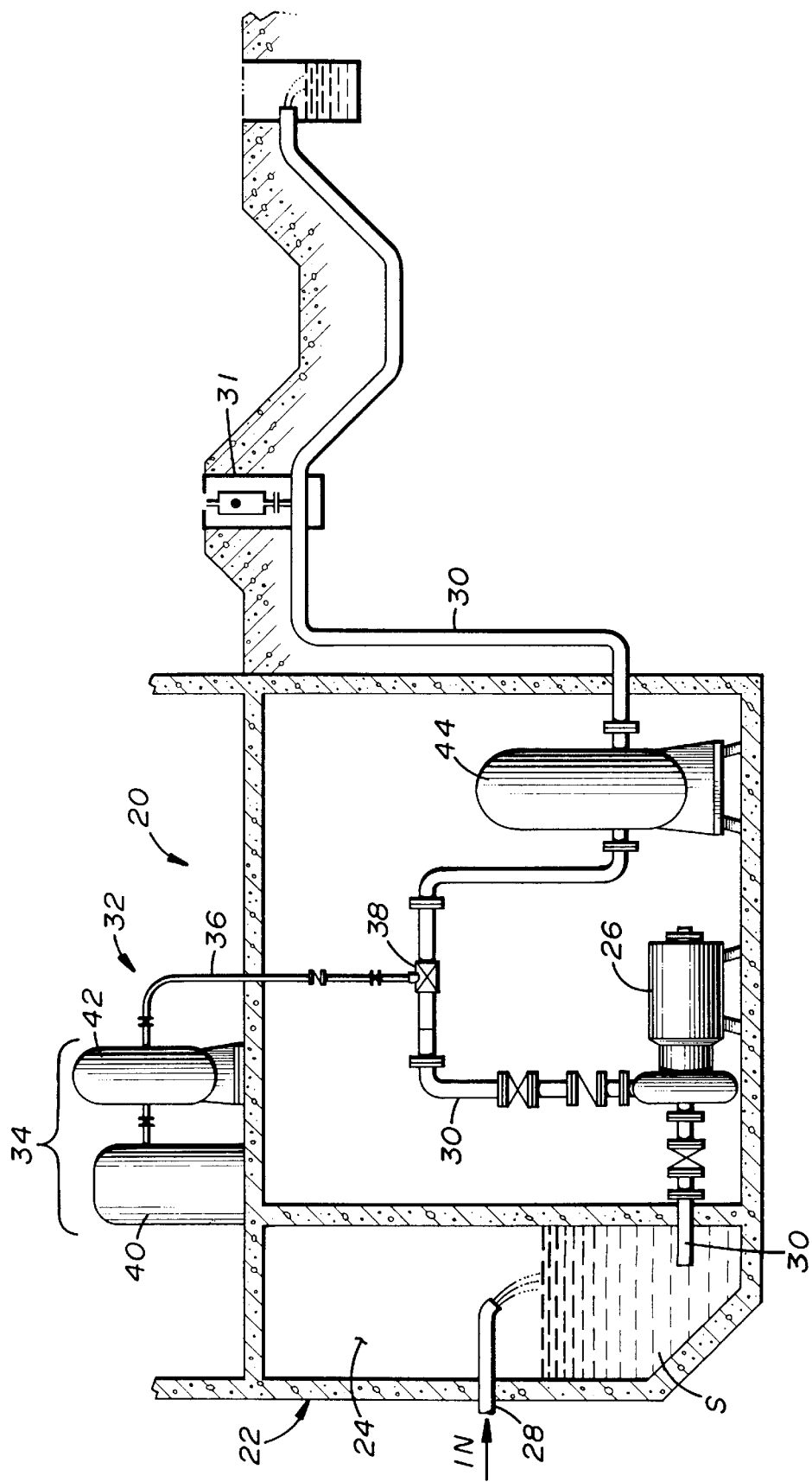
FIG. 2 is a diagrammatic view of a first embodiment of a sewage pre-treatment arrangement of the present invention incorporated in the sewage treatment system of FIG. 1.

Referring to FIG. 2, there is diagrammatically shown a first embodiment of a sewage pre-treatment arrangement of the present invention, generally designated 32, wherein a source 34 of a biological activity enhancing agent is provided at the pumping site 20 and is connected in flow communication via a conduit 36 with the outflow piping section 30 via an injector 38. In the case where concentrated oxygen gas is being employed, the source 34 includes an oxygen generator 40 being operable for generating a high concentration of oxygen from ambient air and an oxygen gas storage unit 42 connected in series between the generator 40 and conduit 36 for storing the gas and then supplying the gas to the injector 38 and thereby into the untreated sewage flow downstream of the main pump 26. Also interposed in the outflow piping section 30 downstream of the main pump 26 and injector 38 is a mixing device 44 wherein mixing of the introduced agent, such as oxygen, with the sewage flow is accomplished. In such manner, pre-treatment of sewage is introduced via the source 34, injector 38 and mixing device 44 at the pumping site 20 into the sewer pipeline infrastructure 16 at a location upstream of the sewage treatment facility 14 of the system 10. In the case where ambient air or an enzyme is the agent being used instead of concentrated oxygen, then the generator 40 and storage unit 42 can be omitted. Thus, the agent introduced can be an oxygen-bearing gas for changing the sewage flow from an anaerobic to aerobic state, an ozonebearing gas for depleting the bacterial content of the sewage flow, or an enzyme for increasing the microbial activity in the sewage flow. As an alternative to the pumping site, the selected site 20 can be a sewage collection site, such as the sump 24, in the pipeline infrastructure. In the case where the site 20 is a pumping site, the agent can be mixed with the sewage flow either upstream or downstream of the main pump 26.

Figure 3:
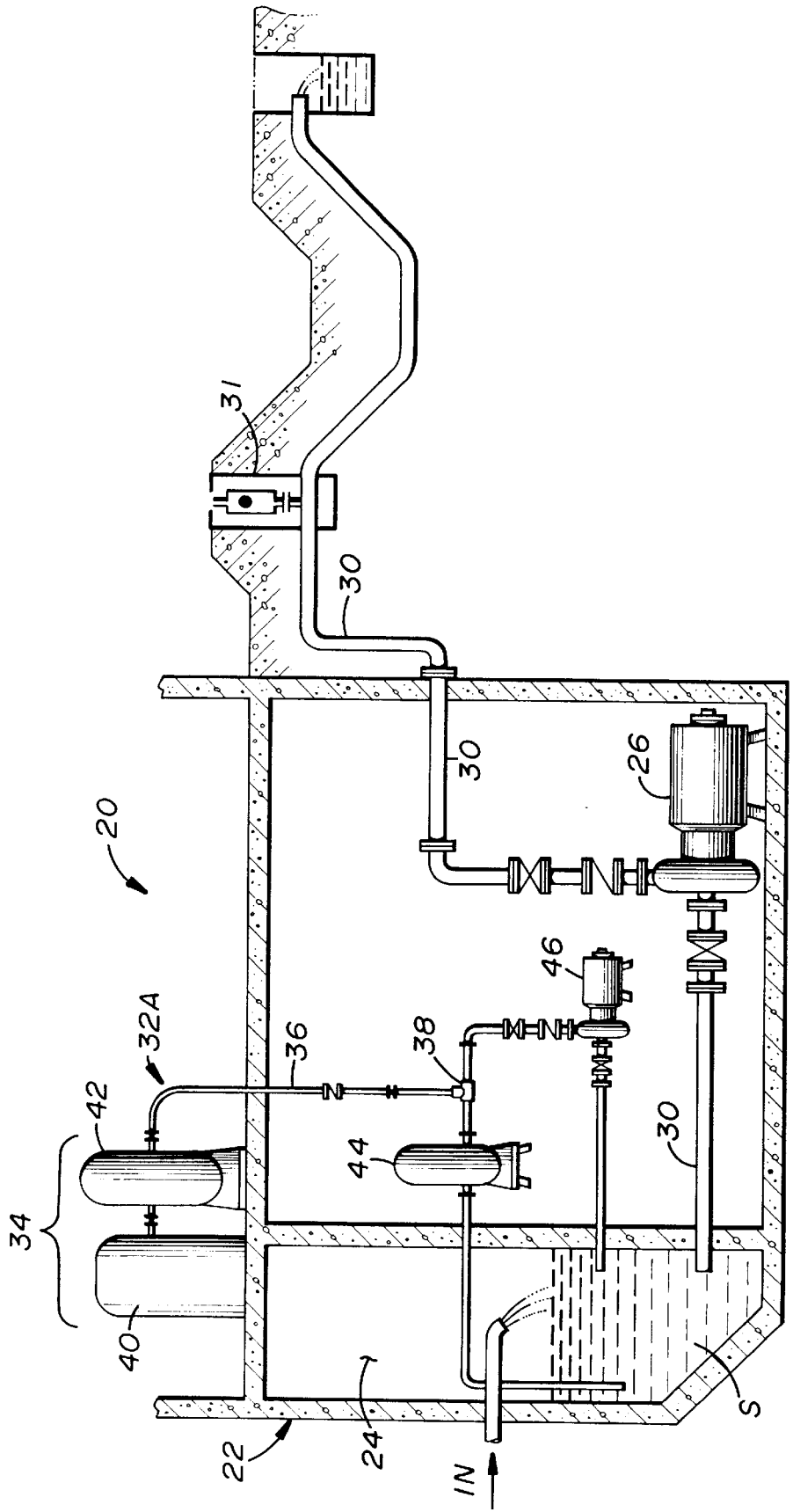
FIG. 3 is a diagrammatic view of a second embodiment of the sewage pre-treatment arrangement of the present invention.

Referring to FIG. 3, there is diagrammatically shown a second embodiment of the sewage pretreatment arrangement 32A of the present invention. The pretreatment arrangement 32A of FIG. 3 is generally similar to the arrangement 32 of FIG. 2. The main difference is that the agent source 34 is connected to the injector 38 which is connected in a series circuit with the mixing device 44, collection sump 24 and an additional pressure pump 46 for recirculating the sewage back to the sump 24 after injection of the agent into the sewage flow. Thus, pre-treatment of the sewage occurs upstream of the main pump 26 which withdraws the at least partially pre-treated sewage from the sump 24.

Thus, the sewage pre-treatment arrangement 32A of FIG. 3 is modified somewhat relative to the sewage pre-treatment arrangement 32 of FIG. 2.

However, the modified arrangement 32A has the same overall objective as the arrangement 32, that being, the introduction of a sewage pre-treatment state upstream of the sewage treatment facility 14 so as to begin to "breakdown" the sewage and thereby reduce total organic load or sludge carried to the sewage treatment facility 14 and thereby increase its capacity. The amount of the reduction in organic loading is dependent on the amount of oxygen supplied. For complete conversion, about 1.4 kilograms of oxygen per kilogram of BOD (Biological Oxygen Demand) is required.

While a gas containing oxygen in a high concentration is the more ideal gas to mix with the untreated sewage flow to achieve the optimum pre-treatment, ambient air can also be used to achieve pre-treatment of the sewage. When using ambient air as the source of oxygen, a greater amount will be required to be mixed with the sewage flow to achieve the same results due to the fact that typically ambient air consists of only about twenty-one percent (21%) oxygen, with the remainder being other gases such as nitrogen. For complete conversion using ambient air, approximately 6.66 kilograms of ambient air per kilogram of BOD would be required to achieve the same results as when concentrated oxygen gas is use. Thus, it may be acceptable, due to the high costs of supplying concentrated oxygen gas to the sewage flow, to use ambient air instead of concentrated oxygen gas and to simply use more pre-treatment units in the pipeline infrastructure.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A method for introduction of sewage pre-treatment in a pipeline infrastructure of a sewage treatment system upstream of a sewage treatment facility of the system and downstream of an untreated sewage discharging facility, said method comprising the steps of:
    (a) selecting a site in a pipeline infrastructure of a sewage treatment system between and external to an untreated sewage discharging facility and a sewage treatment facility of the system;
    (b) providing a source of biological activity enhancing agent at the selected site, said enhancing agent being an enzyme for increasing the microbial activity in the sewage flow; and
    (c) introducing the agent from the source thereof into a flow of untreated sewage at the selected site so as to convert the sewage from an untreated state to a pre-treated state in the pipeline infrastructure upstream of the sewage treatment facility and downstream of said untreated sewage discharging facility.

2. The method of claim 1, wherein said site selected is a sewage pumping site including a pump in the sewer pipeline infrastructure and the agent is mixed with the sewage flow either upstream or downstream of said pump.

3. A method for introduction of sewage pre-treatment in a pipeline infrastructure of a sewage treatment system upstream of a sewage treatment facility of the system and downstream of an untreated sewage discharging facility, said method comprising the steps of:
    (a) selecting a site in a pipeline infrastructure of a sewage treatment system between and external to an untreated sewage discharging facility and a sewage treatment facility of the system;
    (b) providing a source of biological activity enhancing agent at the selected site; and
    (c) introducing the agent from the source thereof into a flow of untreated sewage at the selected site so as to convert the sewage from an untreated state to a pre-treated state in the pipeline infrastructure upstream of the sewage treatment facility and downstream of said untreated sewage discharging facility, said introducing of said agent being by use of a mixing device interposed in the piping of the pipeline infrastructure at the selected site and receiving the introduced agent from the source thereof and mixing the agent with the sewage flow at the site.

4. The method of claim 3, wherein said providing said agent source includes providing an agent generator and injector at said selected site.

5. The method of claim 3, wherein said agent is an oxygen-bearing gas for changing the sewage flow from an anaerobic to aerobic state.

6. The method of claim 3, wherein said agent is an ozone-bearing gas for depleting the bacterial content of the sewage flow.

7. An arrangement for introduction of sewage pre-treatment in a pipeline infrastructure of a sewage treatment system upstream of a sewage treatment facility of the sewage treatment system and downstream of an untreated sewage discharging facility, said arrangement comprising:
    (a) a selected site in a sewer pipeline infrastructure of a sewage treatment system between and external to an untreated sewage discharging facility and a sewage treatment facility of the sewage treatment system;
    (b) a source of a biological activity enhancing agent provided at said selected site, said agent being an enzyme for increasing the microbial content of the sewage flow; and
    (c) means for introducing said agent from said source thereof into a flow of untreated sewage at said selected site so as to convert the sewage from an untreated state to a pre-treated state in the pipeline infrastructure upstream of the sewage treatment facility and downstream of said untreated sewage discharging facility.

8. An arrangement for introduction of sewage pre-treatment in a pipeline infrastructure of a sewage treatment system upstream of a sewage treatment facility of the sewage treatment system and downstream of an untreated sewage discharging facility, said arrangement comprising:
    (a) a selected site in a sewer pipeline infrastructure of a sewage treatment system between and external to an untreated sewage discharging facility and a sewage treatment facility of the sewage treatment system;
    (b) a source of a biological activity enhancing agent provided at said selected site; and
    (c) means for introducing said agent from said source thereof into a flow of untreated sewage at said selected site so as to convert the sewage from an untreated state to a pre-treated state in the pipeline infrastructure upstream of the sewage treatment facility and downstream of said untreated sewage discharging facility, said means for introducing said agent including
        an agent generator at said selected site; and
        a mixing device interposed in the pipeline infrastructure at said selected site for receiving said agent from said agent generator and mixing said agent with the sewage flow at said selected site.

9. The arrangement of claim 8, wherein said agent is an oxygen-bearing gas for changing the sewage flow from an anaerobic to aerobic state.

10. The arrangement of claim 8, wherein said agent is an ozone-bearing gas for depleting the bacterial content of the sewage flow.

11. The arrangement of claim 8, wherein said selected site is a pumping site in the sewer pipeline infrastructure.

12. The arrangement of claim 11, wherein said pumping site includes a pump and said agent is mixed with the sewage flow upstream of said pump at said pumping station.

13. The arrangement of claim 11, wherein said pumping site includes a pump and said agent is mixed with the sewage flow downstream of said pump at said pumping site.

* * * * *